United States Patent [19]

Becher et al.

[11] Patent Number: 4,537,537

[45] Date of Patent: Aug. 27, 1985

[54] METHOD OF SHAPING BY GENERATING FOR PRODUCING PROFILES ON WORKPIECES, AND APPARATUS FOR PERFORMING THIS METHOD

[75] Inventors: Friedrich Becher; Walter Eggert, both of Ludwigsburg, Fed. Rep. of Germany

[73] Assignee: Hermann Pfauter GmbH & Co., Ludwigsburg, Fed. Rep. of Germany

[21] Appl. No.: 406,082

[22] Filed: Aug. 6, 1982

[30] Foreign Application Priority Data

Aug. 7, 1981 [DE] Fed. Rep. of Germany ....... 3131381

[51] Int. Cl.³ .............................................. B23F 5/16
[52] U.S. Cl. ...................................... 409/34; 409/26; 409/36; 409/2
[58] Field of Search .................... 72/84, 102; 409/31, 409/34, 35, 10, 26, 36, 56, 2

[56] References Cited

U.S. PATENT DOCUMENTS

| | | | |
|---|---|---|---|
| 3,021,765 | 2/1962 | Cobb | 409/34 |
| 3,587,384 | 6/1971 | Ditschler | 409/34 |
| 3,722,359 | 3/1973 | Hans et al. | 409/34 |
| 4,136,302 | 1/1979 | Tlaker et al. | 409/34 X |

Primary Examiner—Z. R. Bilinsky
Attorney, Agent, or Firm—Becker & Becker, Inc.

[57] ABSTRACT

A method and apparatus for shaping by generating for producing profiles on workpieces, especially on cylindrical gears. The workpiece and a shaping tool rotate continuously according to a fixed preset transmission ratio. The shaping tool additionally carries out an oscillating movement in the direction of its axis of rotation and thereby generates small cuts on the workpiece during at least two shaping rotations. The small cuts generated after each shaping rotation on the circumference of a circle of contact of the workpiece are provided on the workpiece displaced, relative to the small cuts made during the previous shaping rotation. The apparatus for carrying out the method includes a rotatably driven shaping tool, which carries out a stroke movement in the direction of its axis of rotation, and a rotatably driven clamping device for the workpiece, whereby the rotating motions of the shaping tool and of the clamping device occur continuously according to a fixed preset transmission ratio. The stroke movement of the shaping tool and of the shaping or rotating motion are coupled with each other according to the equation.

12 Claims, 8 Drawing Figures

METHOD OF SHAPING BY GENERATING FOR PRODUCING PROFILES ON WORKPIECES, AND APPARATUS FOR PERFORMING THIS METHOD

BACKGROUND OF THE INVENTION

1. Field of the Invention

The present invention relates to a method of gear or shaping by a gear-type gear cutter as one of the shaping processes by generating for producing profiles on workpieces, especially on cylindrical gears. The workpiece and a shaping tool are rotated continuously according to a fixed preset transmission ratio. The tool additionally carries out an oscillating movement in the direction of its axis of rotation and thereby generates small cuts on the workpiece during at least two shaping turns or rotations.

The present invention also relates to an apparatus for performing such a method, and includes a rotatably driven shaping tool which carries out a stroke movement in the direction of its axis of rotation, and also includes a rotatably driven clamping device for the workpiece, whereby the rotary motions of the tool and of the clamping device occur continuously according to a fixed preset transmission ratio.

The tool and the workpiece carry out a rotary motion during shaping to generate a profile, for example for the manufacture of cylindrical gears; the axes of rotation of the workpiece and of the impact spindle are arranged parallel to each other when producing cylindrical workpieces. Superimposed on the rotation of the tool is a linear stroke movement in the direction of the axis of the tool for chip removal.

The workpiece flank is approximated during gear shaping by generating by making individual small cuts, whereby the shaping tool, for the purpose of chip removal, carries out an oscillating stroke movement in the direction of its axis of rotation. Thus a profile with peaks and valleys, which diverges more or less from the ideal profile, results on the workpiece flank as a result of the small cuts.

2. Description of the Prior Art

The approximation of the workpiece flank to the ideal profile by means of individual small cuts becomes better the smaller the generating feed, i.e. the path about which the workpiece is rotated between the formation of two small cuts carried out directly one after the other and accordingly the slower the workpiece rotates and the larger the number of tool strokes per unit of time. Limits are set for the number of strokes per unit of time for dynamic reasons, for instance oscillations of the machine, tool, workpiece and/or clamping device, and possibly also for technological reaons, for instance too great a roughness of the workpiece flank or too great a tool wear. A good approximation of a shaped tooth flank to the ideal flank accordingly necessitates a relatively low workpiece speed. However, in certain instances the machining must occur at a relatively high workpiece speed and accordingly, with a fixed number of strokes also at a high generating feed. Thus a smaller tool wear is obtained in certain situations during shaping by generating at high generating feed than is obtained during conventional shaping by generating. A gear cutting machine also exists upon which simultaneously two gear systems can be produced by chip removal, the two gear systems, particularly cylindrical gear systems, being formed on a common base body. The machining of the one tooth or gear system occurs by hobbing, and that of the other tooth system occurs by gear shaping by generating. In such a case, the workpiece speed, for economical reasons, is preset via the hobbing process; the workpiece speed, in particular when using multiple and possibly coated hobbers, is considerably higher than with conventional shaping by generating. While frequently during conventional shaping by generating, a single workpiece rotation is sufficient for the finishing operation, i.e. for actual profile shaping, because of the small generating feed, several workpiece rotations are necessary for this profile shaping at high generating feed.

In all of these cases, as a consequence of the relatively high generating feed, there result correspondingly large profile shape deviations which under ideal conditions, i.e. when machine and tool are geometrically, statically and dynamically accurate, increase approximately quadratically with increasing generating feed.

It is an object of the present invention to provide a method and an apparatus such that, with a preset number "i" of the shaping rotations, and with preset design data of the tool and workpiece, the procedural profile shape deviations become minimal, and such that the optimum cutting speed for the respective machining case is practically unaffected, so that a minimal profile shape deviation is obtained.

This object, and other objects and advantages of the present invention, will appear more clearly from the following specification in connection with the accompanying drawings.

SUMMARY OF THE INVENTION

Figure 1:
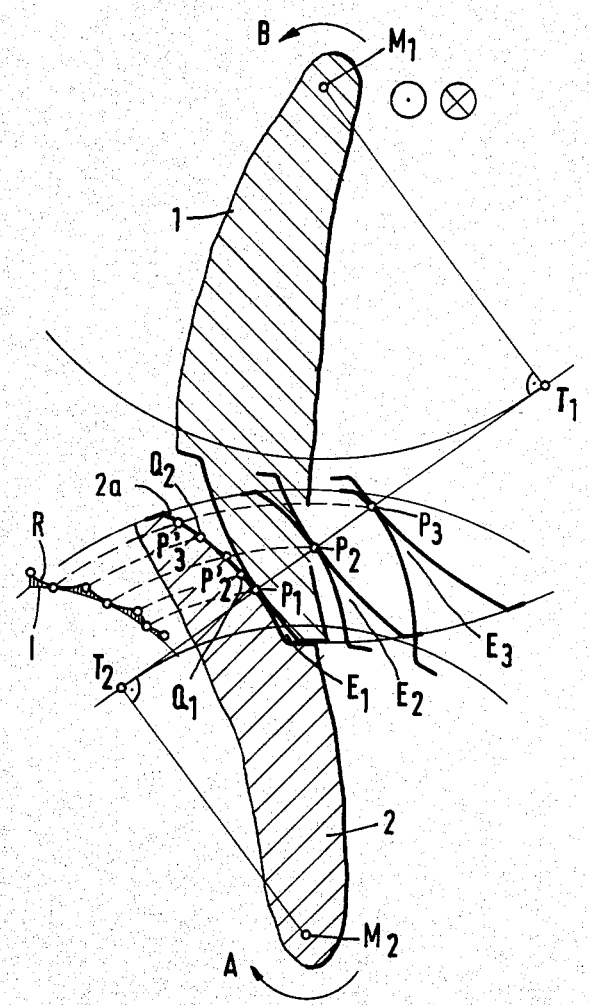
FIG. 1 schematically illustrates the formation of small cuts on a workpiece flank during shaping by generating.

The method of the present invention, is characterized primarily in that the small cuts produced on the circumference of the shaping circle of the workpiece after each shaping rotation are provided on the workpiece displaced, relative to the small cuts made during the previous shaping rotation, precisely by $q \cdot s_w$, which is at least nearly equal to $s_w/i$, where "i" represents the number of shaping rotations, "$s_w$" represents the generating feed, and "q" represents a number $\leq 0.5$.

The apparatus of the present invention is characterized primarily in that the stroke movement of the shaping tool and the shaping movement are coupled with each other according to the equation $p = k(\pm)q$, where p represents the number of small cuts per workpiece rotation $k = \text{int}(p + 0.5)$, and q is at least approximately $1/i$.

According to the present invention, the small cuts, in sequential shaping rotations, may be displaced relative to each other exactly by $q \cdot s_w \approx s_w/i$. It has been found that hereby in a surprisingly simple manner the procedural small cut deviations become minimal. With a number "i" of shaping rotations there is a slight variation by less than 0.5 strokes per workpiece rotation of the number p of small cuts per one workpiece rotation. The profile-shape deviation, due to the precise displacement of the small cuts, takes on a value which is smaller by $1/i^2$ than when the small cuts coincide in each shaping rotation. With the method and apparatus according to the present invention, it is possible to produce profile shapes which optimally approximate the ideal profile shape.

According to specific features of the apparatus of the present invention, the tool stroke movement may be derived from the shaping movement.

The position of the tool stroke movement may be regulated or controlled as a function of the instantaneous angular position of the workpiece or of the shaping tool.

Angle signal pickup means may be provided for respectively detecting the angular position of the workpiece and the position of the shaping tool within the stroke. An actual value forming means may be connected to the output side of the pickup of the shaping tool, and a rated value forming means may be connected to the output side of the pickup of the workpiece. A common comparator may be connected to the output side of the actual value forming means and the rated value forming means, and its output signal, processed further via a regulator and an amplifier, may regulate the stroke movement of the shaping tool.

The shaping movement may be derived from the tool stroke movement.

The shaping movement may be regulated or controlled as a function of the instantaneous position of the shaping tool within the stroke. A rated value forming means may be connected to the output side of the pickup of the shaping tool, and an actual value forming means may be connected to the output side of the pickup of the workpiece. A common comparator may be connected to the output side of the actual forming means and the rated value forming means; the output signal of the comparator, further processed via a regulator and an amplifier, may control the rotary movement of the workpiece.

DETAILED DESCRIPTION

Figure 4:
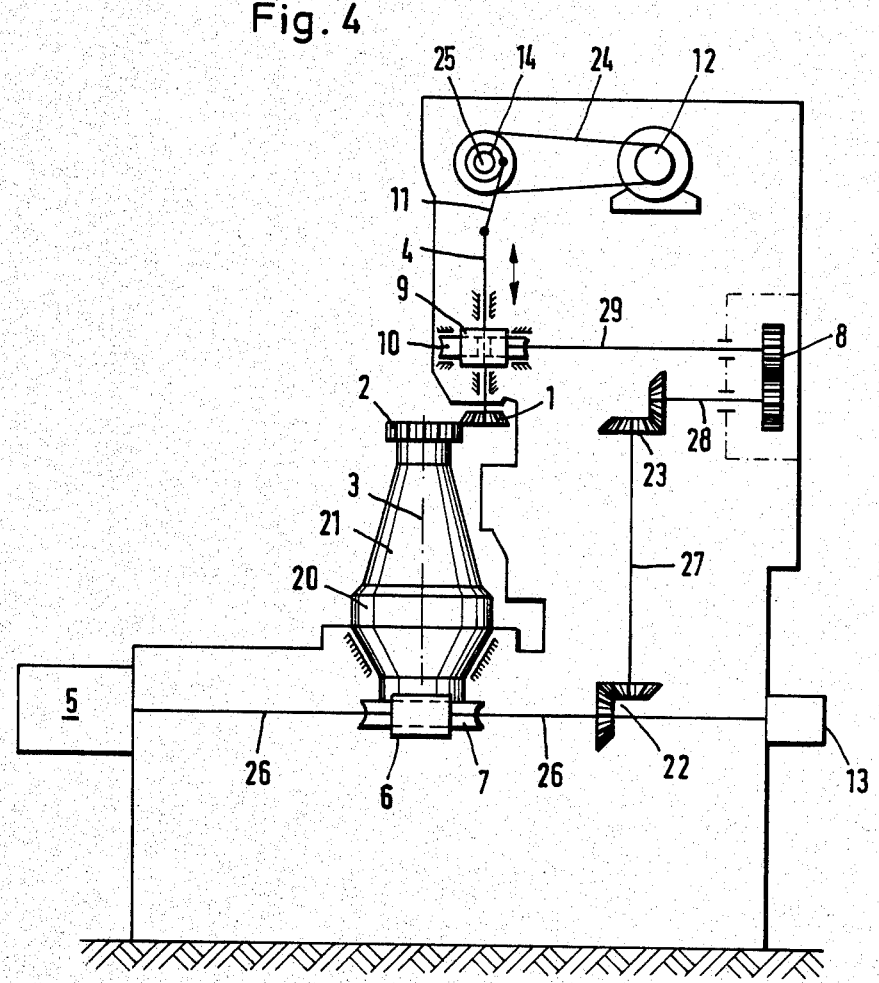
FIG. 4 is a schematic illustration of an apparatus having features in accordance with the present invention.

Referring now to the drawings in detail, and in particular to FIG. 1, when shaping by generating, the sharp tool 1 and the workpiece 2 carry out a rotary movement during the chip removal. The axis of rotation 3 of the workpiece 2, and the axis of rotation of the tool 1, are arranged parallel to each other when producing cylindrical workpieces (FIG. 4). A stroke movement in the direction of the axis of the tool 1 is superimposed upon the rotation of the tool 1 for chip removal purposes.

The workpiece flank or side 2a is approximated by individual small cuts during shaping by generating. Three shaping contact positions $E_1$, $E_2$, $E_3$ of the workpiece 2 and of the shaping tool 1 are illustrated in FIG. 1. The workpiece 2 rotates about $M_2$ in the direction of the arrow A, and the tool 1 rotates about $M_1$ in the direction of the arrow B. The tool 1 carries out an oscillating stroke movement at right angles to the plane of the drawing illustration for chip removal purposes.

Small cuts, which result from strokes of the shaping tool 1 carried out directly following one another, are made at $P_1$, $P_2$, $P_3$. If $P_2$ and $P_3$ are turned back about $M_2$ into the position which they occupied in the contact position $E_1$, the points $P_2'$, $P_3'$ are obtained. It is now apparent that for instance the small cut carried out at $P_2$ shapes the workpiece profile in a region around $P_2$ or $P_2'$, which region is located between $Q_1$ and $Q_2$. $Q_1$ is located approximately halfway between $P_1$ and $P_2'$, and $Q_2$ is located approximately halfway between $P_2'$ and $P_3'$ (FIG. 1).

The shaping tool 1, in the contact or engagement position $E_2$, contacts the ideal workpiece profile only at $P_2$. Directly adjoining points of the ideal workpiece flank are spaced from the tool flank. The actual profile deviates from the ideal profile by this spacing; a procedural profile-shape deviation $f_{fv}$ exists.

The ideal profile I and the real or actual profile R upon approximation of the workpiece flank by three small cuts are illustrated in the left part of FIG. 1. The profile-shape deviations are measured at right angles to the ideal profile I.

Figure 2:
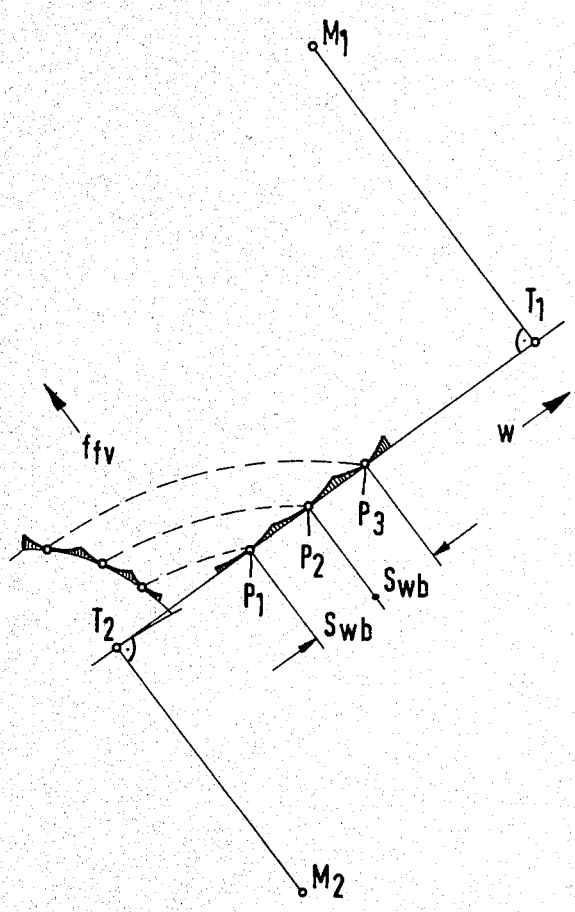
FIG. 2 is an illustration of the profile-shape deviation of the workpiece flank of FIG. 1.

The interrelationship between the profile-shape deviation on the workpiece flank 2a according to FIG. 1 and a pertaining diagram are illustrated in FIG. 2, in which the profile-shape deviation $f_{fv}$ is plotted over the shaping path w. The deviations, measured at right angles to the true flank, i.e. the ideal profile I, are respectively plotted at right angles to the straight line w of that location at which the path of the corresponding point of the true flank of rotation about $M_2$ intersects the straight line w. The course of $f_{fv}$ over w can be described approximately by quadratic paraboles having apexes in $P_1$, $P_2$ and $P_3$. Only profile-shape deviations inherent in the process have been taken into consideration in FIG. 2. The intersecting point of directly adjoining parabolas furnishes the maxiumum profile-shape deviation $f_{fv}$ existing in the region between these parabolas, as clearly recognizable in the further views of FIGS. 3a, 3b, and 3c which are still to be described.

Figure 3A:
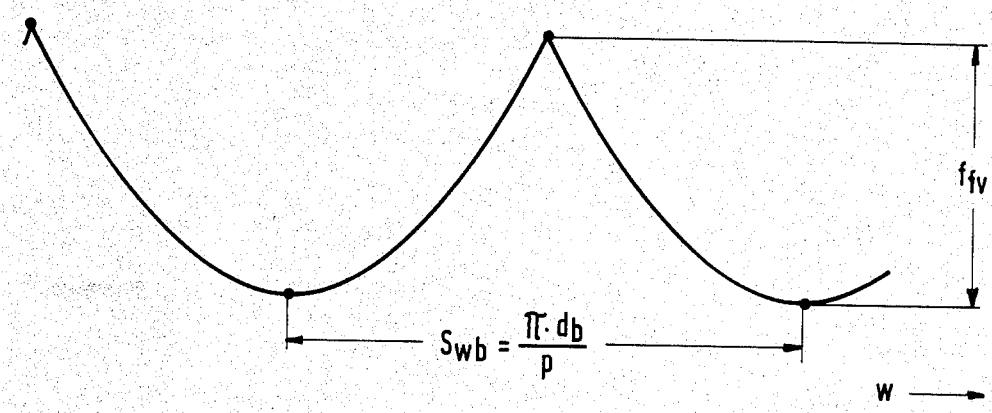
FIGS. 3a, 3b, and 3c respectively are enlarged illustrations of different profile-shape deviations of workpieces having a circular involute face-section profile.
Figure 3B:
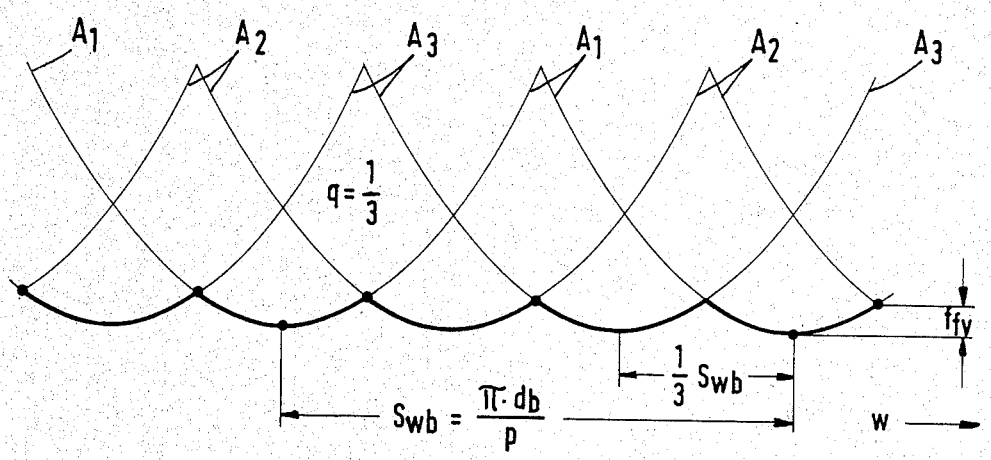
Figure 3C:
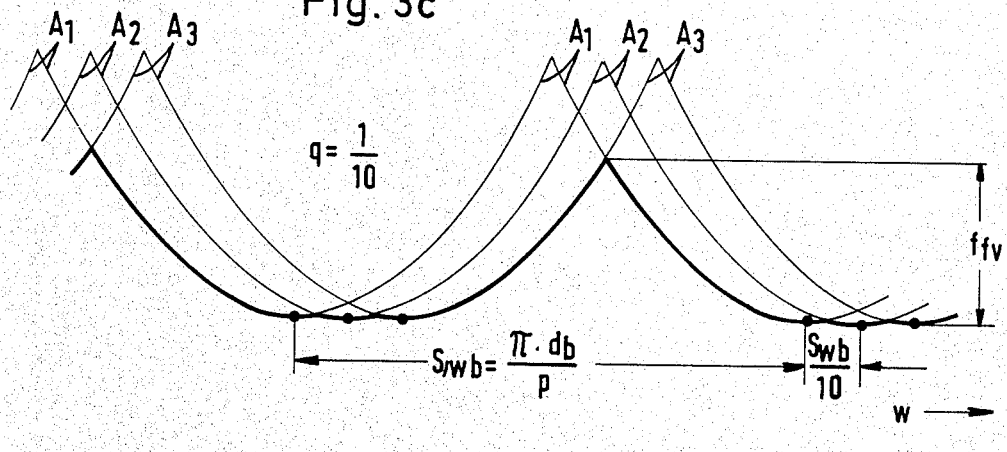

The parabolas with the apexes at $P_1$, $P_2$, $P_3$ mostly have a different curvature. However, for simplication purposes parabolas with identical curvature are illustrated in the views of FIGS. 3a, 3b, and 3c.

The path about which the workpiece 2 is rotated between the formation of two directly sequentially carried out small cuts is called the generating feed. The generating feed, relative to the circumference of the workpiece divided circle, is $s_w$; the generating feed relative to the circumference of the workpiece base circle, and thus to the shaping path w, is $s_{wb}$. In FIGS. 1 and 2, $$\overline{M_2 \, T_2} = \frac{1}{2} d_b,$$

where $d_b$ is the base line diameter of the workpiece toothing.

One equation $$s_w = \frac{\pi \cdot d}{p}$$

applies to the generating feed $s_w$. In this equation d is the shaping circle diameter of the workpiece toothing, and p is the number of shaping strokes or small cuts per workpiece rotation.

One equation $$s_{wb} = \frac{\pi \cdot d_b}{p}$$

applies to the generating feed $s_{wb}$.

Both feeds are related to each other via the known equation $s_{wb}=s_w \cdot \cos \alpha_t$. In this equation, $\alpha_t$ is the face contact angle of the toothing. Naturally, only $s_w$, i.e. not $s_{wb}$, exists with non circular involute workpiece profiles, since with non circular involute workpiece profiles $\alpha_t$ does not exist. The approximation of the workpiece flank by individual small cuts improves the smaller the generating feed $s_w$ is, i.e. the slower the workpiece rotates and the greater the number of tool strokes is per unit of time. A good approximation of a shaped tooth flank to an ideal flank thus has a precondition a relatively low workpiece speed. In certain cases however, there should or must be machining at relatively high workpiece speed and, accordingly, at a fixed number of strokes, also at high generating feed.

The spacing of adjoining small cuts which are made within one workpiece rotation is, in the direction of the shaping path w, equal to the generating feed $s_{wb}=\pi \cdot d_b/p$ (FIG. 3a). In this equation, $d_b$ is the base circle diameter of the workpiece, and p is the number of small cuts or shaping strokes carried out in one workpiece rotation. The profile-shape deviation $f_{fv}$ inherent to the process increases under ideal conditions approximately quadratically with increasing generating feed $s_{wb}$. With the method according to the present invention there is now proceeded on the basis of splitting up the number p of the small cuts carried out in one workpiece rotation into an integral portion $k=\text{int}(p+0.5)$, and a portion $q \leq 0.5$. Then follows $p=k(\pm)q$. During shaping by generating, $q<<k$ and $q<<p$.

After every workpiece rotation there occurs according to this equation a displacement of the just formed small cuts relative to the small cuts formed prior to a workpiece rotation by $q \cdot s_{wb}$, i.e. about q times the spacing between adjoining small cuts at only one shaping rotation. The displacement consequently is zero for $q=0$, which means the small cuts, which are to form a predetermined flank portion during every workpiece rotation coincide; the profile-shape deviation $f_{fv}$ becomes as large as with only one shaping rotation. For $q \neq 0$, there are made further small cuts between two directly adjacent small cuts which were made during the first shaping rotation. Consequently, a smaller profile-shape deviation results.

The positioning of the small cuts to be formed during a second, third, or fourth shaping rotation is now undertaken in such a way that the procedural profile-shape deviation $f_{fv}$ becomes minimal. This is attained when, at i shaping rotations, the number of small cuts p per one workpiece rotation is slightly varied in such a way that the non-integral portion q is at least approximately, preferably however exactly, 1/i. The profile-shape deviation $f_{fv}$ in this case takes on a value which is smaller by $1/i^2$ than the value for $q=0$, or for only one shaping rotation.

FIGS. 3a, 3b, and 3c profile-shape deviation diagrams of a shaped toothing for three different values of q. The machining according to the illustration of FIG. 3a takes place either only during one shaping rotation, or during several shaping rotations with $q=0$.

The profile-shape deviations $f_{fv}$ are maximum. Three shaping rotations were respectively carried out according to FIGS. 3b and 3c. $q=1/i=\frac{1}{3}$ in the illustration of FIG. 3b, and $q=1/10$ in the illustration of FIG. 3c. The profile-shape deviation $f_{fv}$ is considerably smaller in the case of FIG. 3b than in the case of 3a. The thus generated flank profile comes very close to the ideal profile, since the portion $q=1/i$ has been selected. In the case of FIG. 3c, the portion q is no longer 1/i, since with three shaping rotations $q=1/10$ has been selected. The profile-shape deviations $f_{fv}$ again have become larger and nearly attain values which correspond to those of FIG. 3a. If the small cut curves $A_2$ and $A_3$ in FIG. 3c are displaced by equal amounts even closer relative to each other, i.e. if q is increased compared to the value in FIG. 3c, the profile-shape deviation $f_{fv}$ first becomes smaller and attains a minimum at $q=1/i=\frac{1}{3}$. The profile-shape deviation increases again with further increase of q. Optimum conditions result in accordance with the present invention for $q=1/i$, in the illustrated embodiment thus for $q=\frac{1}{3}$.

With a preset stroke of the shaping tool 1, the cutting speed can be adjusted via the number of strokes $n_H$. An optimum cutting speed requires an optimum number of strokes $n_H$. The following equation applies:

$$n_H = p \cdot n_2 = (k(\pm)q)n_2.$$

In this equation, $n_2$ represents the workpiece speed. As set forth above, $q<<p$. There results herefrom that q only immaterially influences the optimum number of strokes and thus the optimum cutting speed.

Rotating motion when shaping by generating refers to the for instance during the machining simultaneously occurring rotational movement of the workpiece 2 and of the shaping tool 1. The rotating motion and the stroke movement can be generated by separate motors. Both motions, however, can also be generated by a common motor. In this case, a gear unit is arranged between the motor and a gear unit for converting the rotation movement into the oscillating movement of the shaping tool in order to adapt the workpiece rotation to the stroke movement. In the first situation, the speed of the for the most part stepless controllable motor is selected for the drive of the rotating motion and thus of the workpiece rotation, while taking into consideration the number of strokes of the shaping tool, so that the desired generating feed results. In the second situation, a transmission ratio is selected in the adaptor transmission, which is mostly a change gear transmission, in such a way that likewise the desired generating feed results.

The apparatus for shaping by generating is constructed in such a way that the stroke movement of the shaping tool 1, and the rotating motion, are coupled according to the equation $p=k(\pm)q$, with q being at least approximately, preferably however exactly, 1/i.

As shown in FIG. 4, the apparatus has a drive motor 5, upon the drive shaft 26 of which there is seated an index or dividing worm 6 which meshes with a worm gear 7 of a workpiece turntable 20. A workpiece clamping device 21 for the workpiece 2 is rigidly connected with the turntable 20. The shaft 26 is drivingly connected with an intermediate shaft 27 via a bevel gearing 22; the intermediate shaft 27 is coupled with an input shaft 28 of an index change gear transmission 8 via a further bevel gearing 23. The rotating motion of the shaping tool 1 is adapted to the rotating motion of the workpiece 2 by means of this transmission. A power take-off or drive shaft 29 of the transmission 8 is provided with an index worm 9 which meshes with a worm gear 10 on a shaping spindle 4, which carries the shaping tool 1.

A further motor 12 is provided for the stroke movement of the tool 1; the motor 12 drives a crank gear or connecting-rod assembly 11 via a transmission, which in the illustrated embodiment is a belt drive 24, the crank gear 11 being connected with the spindle 4. The index worm gear 10 is connected with a non-illustrated splined-shaft profiled member in order to be able to carry out the stroke movement. However, any other suitable sliding mounting can be provided for the spindle 4.

Figure 5:
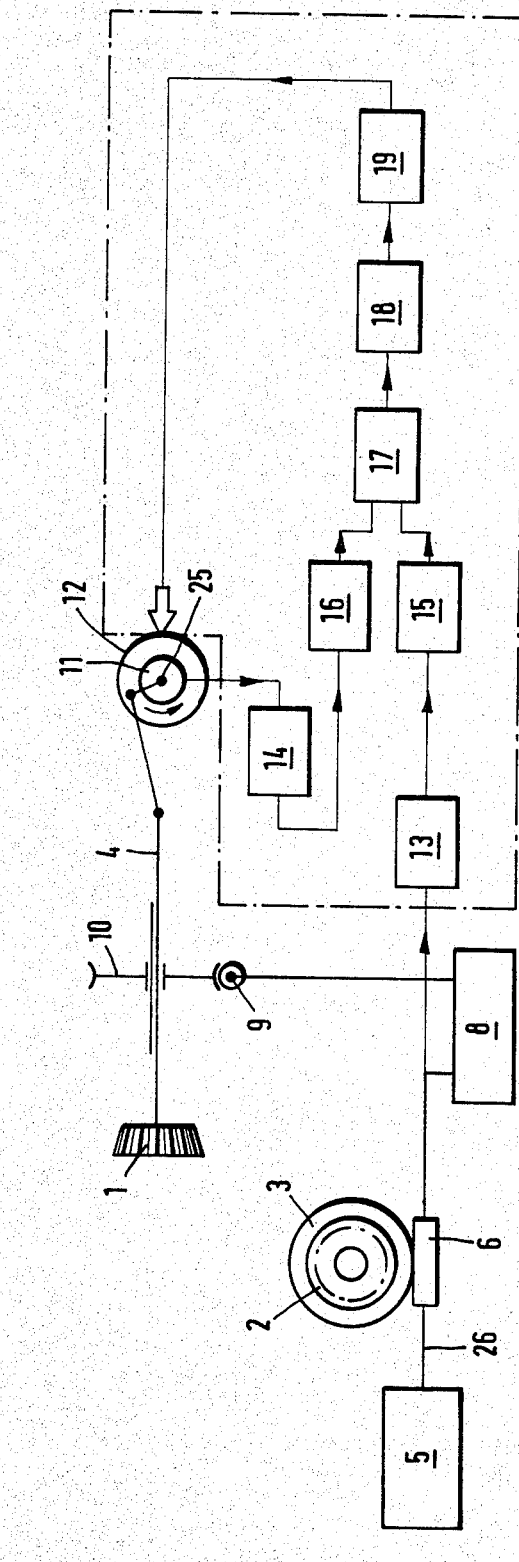
FIG. 5 shows a first possible control device for the apparatus of FIG. 4.

The angular position of the workpiece turntable 20 according to FIG. 5 is detected indirectly via an angle signal element pickup 13 on the drive shaft 26 of the index worm 6 in the workpiece drive, and the angular position of the crankshaft 25 of the crank gear 11 is detected via an angle signal element pickup 14. The pickups 13, 14 are commercially available electronic components which are installed in housings from which drive shafts project. These drive shafts are rigidly connected with the drive shaft 26 or the crankshaft 25. The pickups 13, 14 deliver a predetermined number of pulses to the rated or actual value forming means 15, 16 for each rotation of the drive shaft 26 or of the crankshaft 25. For example, 100 pulses are generated during a rotation of 360°. 50 pulses would then be generated during a rotation of 180°. The instantaneous angular position of the drive shaft or crankshaft can thus be determined from the number of pulses.

The pulse sequence picked up at 13 is processed in a pulse-preparing means 15 in such a way that at the exit thereof exactly $p=k(\pm)q$ times as many pulses appear per rotation of the workpiece turntable 20 as are delivered via the pickup 14, possibly after adaptation thereof in a pulse-preparing means 16, for each rotation of the shaft 25 and thus accordingly each stroke of the tool, and thereby are available at the exit of the pulse preparing means 16. The pulse preparing means 15 operates as a rated value forming means, and the pulse preparing means 16 operates as an actual value forming means. Their output signals are supplied to a phase comparator 17, in which the control error or deviation, i.e. the deviation of the angular position of the crankshaft 25 from the rated value, is formed, the rated value being given by the actual value angular position of the workpiece turntable 20 and the desired transmission ratio corresponding to the equation $p=k(\pm)1/i$. This control error or deviation is supplied to the motor 12 via a regulator 18 and an amplifier 19. The drive of the stroke movement of the tool 1 occurs from there, as described, via the belt drive 24, the crank gear 11, and the impact spindle 4 in exact coordination to the workpiece rotation. The apparatus can also be constructed in such a way that to the output side of the pickup 13 of the workpiece 2 there is connected an actual value forming means, and to the output side of the pickup 14 of the shaping tool 1 there is connected a rated value forming means. In this case, the workpiece rotation is adapted to the stroke movement of the tool 1. Also then the coupling between the stroke movement and the shaping movement can be adjusted accurately according to the equation $p=k(\pm)1/i$.

Figure 6:
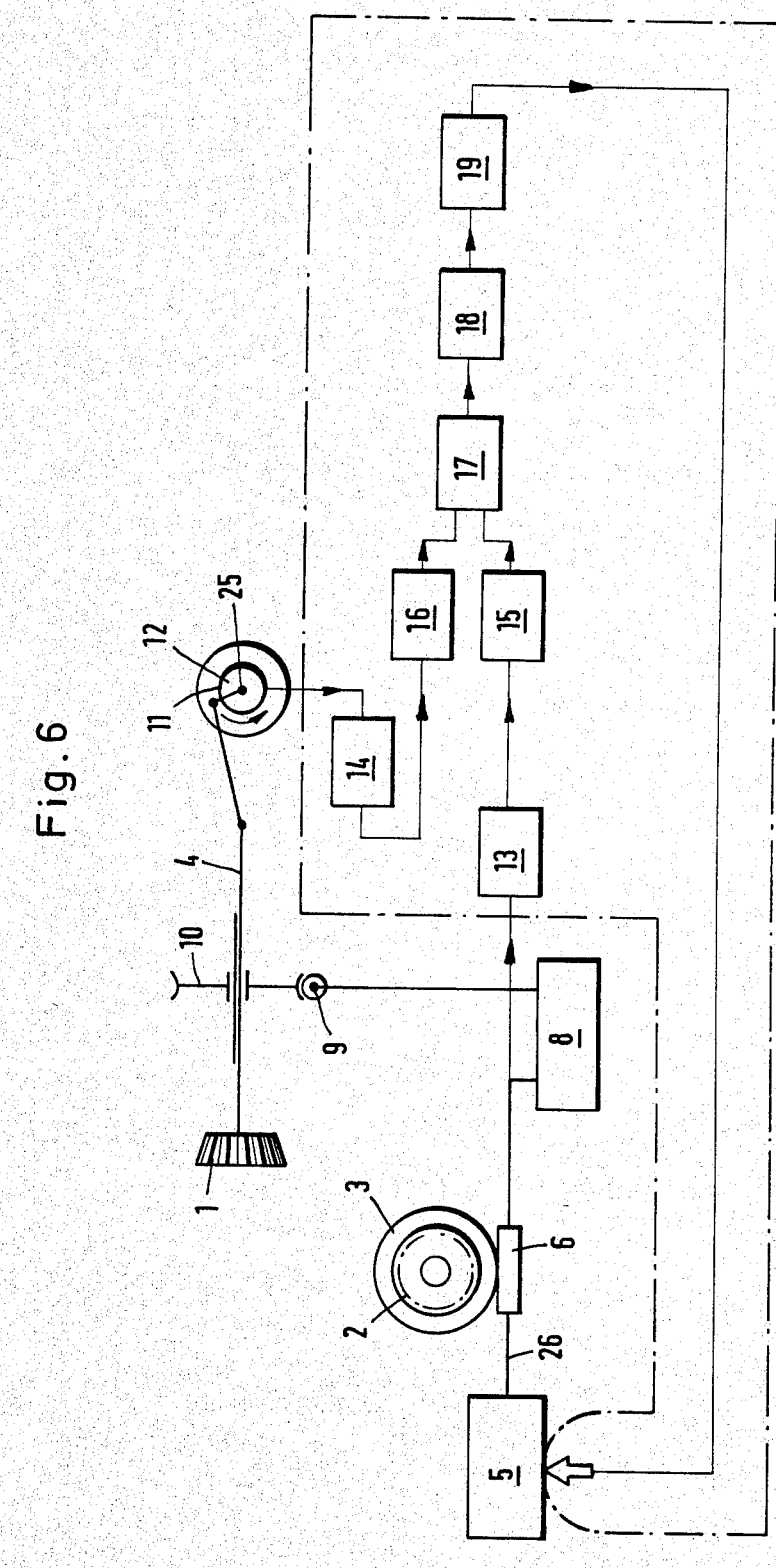
FIG. 6 shows a second possible control device for the apparatus of FIG. 4.

While in the first situation, the instantaneous stroke position of the tool is controlled as a function of the instantaneous angular position of the workpiece, in the second situation the control of the position of the angular position of the workpiece 2 occurs as a function of the instantaneous stroke position of the shaping tool 1 (see FIG. 6). In this situation, the output signal of the amplifier 19 is supplied to the drive motor 5. The drive occurs from there via the drive shaft 26, the index worm 6, and the worm gear 7 to the workpiece turntable 20 in exact coordination with the stroke position of the shaping tool 1.

The stroke movement of the shaping tool 1 can also be derived directly from the rotation of the workpiece 2 via suitable mechanical, hydraulic, or electrical elements. Conversely, the workpiece rotation can be derived directly from the stroke movement of the shaping tool 1 via suitable mechanical, hydraulic, or electrical elements.

It is furthermore possible to create a fixed speed ratio via an extremely accurate speed control means, for example by utilizating quartz-controlled pulse generators, for the drive of the workpiece rotation and workpiece stroke.

Finally, the positioning of both of the drives can be controlled from a central system.

The present invention is, of course, in no way restricted to the specific disclosure of the specification and drawings, but also encompasses any modifications within the scope of the appended claims.

What is claimed is:

1. An apparatus for shaping by generating for producing profiles on workpieces with a tool, said apparatus comprising:
   a rotatably driven shaping tool which additionally carries out a stroke movement in the direction of its axis of rotation; and
   a rotatably driven clamping device for said workpiece; means for the rotary motions of said tool and of said clamping device occurring continuously according to a fixed preset transmission ratio, and means for the stroke movement of said tool and the shaping movement being coupled with one another according to the equation $p=k(\pm)q$, where p is the number of small cuts per workpiece rotation, $k=\text{int}(p+0.5)$, and q is at least approximately $1/i$, where i is the number of shaping rotations.

2. An apparatus according to claim 1, in which means are provided for the stroke movement of said tool being derived from the shaping movement.

3. An apparatus according to claim 2, in which means are provided to make the position of the stroke movement of said tool regulatable as a function of the instantaneous angular position of one of said workpiece and said tool.

4. An apparatus according to claim 3, which includes respective angle signal pickups for respectively detecting the angular position of said workpiece and the position of said tool within the stroke.

5. An apparatus according to claim 4, which includes an actual value forming device connected to the output side of said pickup for said tool, and a rated value forming device connected to the output side of said pickup for said workpiece.

6. An apparatus according to claim 5, which includes a common comparator connected to the output sides of said actual and rated value forming devices; and which includes a regulator and amplifier for further processing the output signal of said comparator, said processed signal being intended for regulation of the stroke movement of said tool.

7. An apparatus according to claim 1, in which the shaping movement is derived from the stroke movement of said tool.

8. An apparatus according to claim 7, in which the shaping movement is regulatable as a function of the instantaneous position of said tool within the stroke.

9. An apparatus according to claim 8, which includes respective angle signal pickups for respectively detecting the angular position of said workpiece and the position of said tool within the stroke; and which includes a rated value forming device connected in the output side of said pickup of said tool, and an actual value forming device connected to the output side of said pickup of said workpiece.

10. An apparatus according to claim 1, which includes a common comparator connected to the output sides of said actual and rated value forming devices; and which includes a regulator and amplifier for further processing the output signal of said comparator, said processed output signal being intended for regulation of the rotary movement of said workpiece.

11. A method of shaping by generating for producing profiles on workpieces, said method including the steps of:
continuously rotating said workpiece and a shaping tool according to a fixed preset transmission ratio;
effecting an oscillating movement of said tool in the direction of the axis of rotation thereof to thereby generate small cuts on the circumference of said workpiece during at least two shaping rotations thereof; and
displacing said small cuts produced on said workpiece after each shaping rotation, said small cuts produced during a given rotation being displaced relative to the small cuts made during the previous rotation by $q \cdot s_w$, which is at least nearly equal to $s_w/i$, where i is the number of shaping rotations, $s_w$ is the generating feed, and q is $\leq 0.5$.

12. A method according to claim 1, which includes the step of displacing said cuts exactly by $q \cdot s_w = s_w/i$.

* * * * *